(12) United States Patent
Barrell et al.

(10) Patent No.: US 11,429,587 B1
(45) Date of Patent: Aug. 30, 2022

(54) MULTIPLE DURATION DEDUPLICATION ENTRIES

(71) Applicant: Seagate Technology LLC, Cupertino, CA (US)

(72) Inventors: Michael Barrell, Longmont, CO (US); Ian Davies, Longmont, CO (US); Kenneth F Day, III, Cedar Park, CO (US); Douglas Dewey, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 638 days.

(21) Appl. No.: 15/638,302

(22) Filed: Jun. 29, 2017

(51) Int. Cl.
*G06F 16/23* (2019.01)
*G06F 16/22* (2019.01)

(52) U.S. Cl.
CPC ...... *G06F 16/2365* (2019.01); *G06F 16/2255* (2019.01)

(58) Field of Classification Search
CPC .................... G06F 16/2365; G06F 16/2255
See application file for complete search history.

(56) References Cited

U.S. PATENT DOCUMENTS

| | | |
|---|---|---|
| 5,943,677 A | 8/1999 | Hicks |
| 7,996,371 B1 | 8/2011 | Deshmukh |
| 8,086,799 B2 | 12/2011 | Mondal et al. |
| 8,131,687 B2 | 3/2012 | Bates et al. |
| 8,397,051 B2 | 3/2013 | Beaman et al. |
| 8,407,190 B2 | 3/2013 | Prahlad et al. |
| 8,453,257 B2 | 5/2013 | Anglin et al. |
| 8,458,144 B2 | 6/2013 | Maydew et al. |
| 8,694,703 B2 | 4/2014 | Hans et al. |
| 8,732,133 B2 | 5/2014 | Attarde |
| 8,812,874 B1 | 8/2014 | Clifford |
| 8,930,306 B1 | 1/2015 | Ngo et al. |
| 8,954,398 B1 | 2/2015 | Zhang et al. |
| 9,047,302 B1 | 6/2015 | Bandopadhyay |
| 9,092,151 B1 * | 7/2015 | Floyd ................... G06F 16/215 |
| 9,449,011 B1 | 9/2016 | Chen et al. |
| 9,489,135 B2 | 11/2016 | Dukes et al. |
| 9,514,145 B2 | 12/2016 | Chhaunker et al. |

(Continued)

OTHER PUBLICATIONS

Srinivasan et al.,"iDedup: Latency-aware, inline data deduplication for primary storage", NetApp, Inc., 2012, 14 pages.

*Primary Examiner* — Kannan Shanmugasundaram
(74) *Attorney, Agent, or Firm* — Kirk A. Cesari; Christian W. Best

(57) ABSTRACT

Systems and methods are disclosed for multiple duration deduplication entries. A processor may be configured to perform data deduplication operations, including setting a first indicator for first metadata stored to a hash database identifying a first time interval to maintain the first metadata in the database, and setting a second indicator for second metadata stored to the database identifying a second time interval to maintain the second metadata in the database longer than the first time interval. The processor may remove the first metadata from the database when no duplicative data is detected for the first metadata within the first time interval, and remove the second metadata from the database when no duplicative data is detected for the second metadata within the second time interval.

20 Claims, 11 Drawing Sheets

(56) References Cited

U.S. PATENT DOCUMENTS

| | | | |
|---|---|---|---|
| 9,547,664 B2 | 1/2017 | Zinar | |
| 9,575,673 B2 | 2/2017 | Mitkar et al. | |
| 9,633,022 B2 | 4/2017 | Vijayan | |
| 9,639,274 B2 | 5/2017 | Maranna et al. | |
| 9,672,243 B2 | 6/2017 | McCreight et al. | |
| 2009/0049260 A1* | 2/2009 | Upadhyayula | G06F 3/0608 711/162 |
| 2010/0217953 A1 | 8/2010 | Beaman et al. | |
| 2010/0306176 A1* | 12/2010 | Johnson | G06F 16/125 707/664 |
| 2010/0306412 A1 | 12/2010 | Therrien et al. | |
| 2011/0099351 A1 | 4/2011 | Condict | |
| 2011/0307447 A1 | 12/2011 | Sabaa et al. | |
| 2012/0124012 A1 | 5/2012 | Provenzano et al. | |
| 2012/0124046 A1 | 5/2012 | Provenzano | |
| 2013/0036289 A1 | 2/2013 | Welnicki et al. | |
| 2013/0297569 A1* | 11/2013 | Hyde, II | G06F 16/10 707/692 |
| 2013/0318051 A1 | 11/2013 | Kumar et al. | |
| 2013/0339302 A1 | 12/2013 | Zhang et al. | |
| 2013/0339319 A1 | 12/2013 | Woodward et al. | |
| 2014/0059016 A1* | 2/2014 | Tsuchiya | G06F 16/1748 707/692 |
| 2014/0115258 A1 | 4/2014 | Week et al. | |
| 2014/0219041 A1 | 8/2014 | Kim et al. | |
| 2014/0344216 A1 | 11/2014 | Abercrombie | |
| 2015/0161000 A1* | 6/2015 | Kim | G06F 11/108 714/6.24 |
| 2015/0161194 A1 | 6/2015 | Provenzano et al. | |
| 2015/0261776 A1* | 9/2015 | Attarde | G06F 16/1748 707/664 |
| 2015/0261792 A1 | 9/2015 | Attarde et al. | |
| 2016/0077926 A1 | 3/2016 | Mutalik et al. | |
| 2016/0078068 A1* | 3/2016 | Agrawal | G06F 16/215 707/692 |
| 2016/0162207 A1 | 6/2016 | Sharma et al. | |
| 2016/0306818 A1 | 10/2016 | Vijayan et al. | |
| 2016/0306820 A1 | 10/2016 | Agrawal et al. | |
| 2017/0083408 A1 | 3/2017 | Vijayan | |
| 2017/0124108 A1 | 5/2017 | Mitkar et al. | |
| 2017/0132088 A1 | 5/2017 | Maranna et al. | |
| 2017/0206022 A1 | 7/2017 | Theinert | |
| 2018/0218005 A1* | 8/2018 | Kuhtz | G06F 16/1752 |

* cited by examiner

MULTIPLE DURATION DEDUPLICATION ENTRIES

SUMMARY

In certain embodiments, an apparatus may comprise a processor configured to perform data deduplication operations, including: maintain a first unique entry in a hash database for a first duration, and maintain a second unique entry in the hash database for a second duration.

In certain embodiments, an apparatus may comprise a processor configured to perform data deduplication operations to prevent storage of duplicative data, including: maintain a hash database storing database entries having metadata identifying existing stored data, and store new database entries to the hash database when new unique data is received for storage. The processor may set a first indicator for a first database entry, the first indicator identifying a first time interval to maintain the first database entry in the hash database, and set a second indicator for a second database entry, the second indicator identifying a second time interval to maintain the second database entry in the hash database longer than the first time interval.

In certain embodiments, a method may comprise performing data deduplication operations to prevent storage of duplicative data, including maintaining a hash database storing database entries having metadata identifying existing stored data, and storing new database entries to the hash database when new unique data is received for storage. The method may comprise setting a first indicator for a first database entry, the first indicator identifying a first time interval to maintain the first database entry in the hash database, setting a second indicator for a second database entry, the second indicator identifying a second time interval to maintain the second database entry in the hash database longer than the first time interval, and removing database entries for unique stored data from the hash database after a duration exceeding a corresponding time interval.

DETAILED DESCRIPTION

In the following detailed description of the embodiments, reference is made to the accompanying drawings which form a part hereof, and in which are shown by way of illustrations. The features of the various embodiments and examples described herein may be combined, exchanged, removed, other embodiments utilized, and structural changes made without departing from the scope of the present disclosure.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

In accordance with various embodiments, dedicated hardware implementations including, but not limited to, application specific integrated circuits, programmable logic arrays, and other hardware devices can be constructed to implement the methods and functions described herein. Further, the methods and functions described herein may be implemented as a device, such as a memory device, including instructions that when executed cause a processor to perform the methods.

Figure 1:
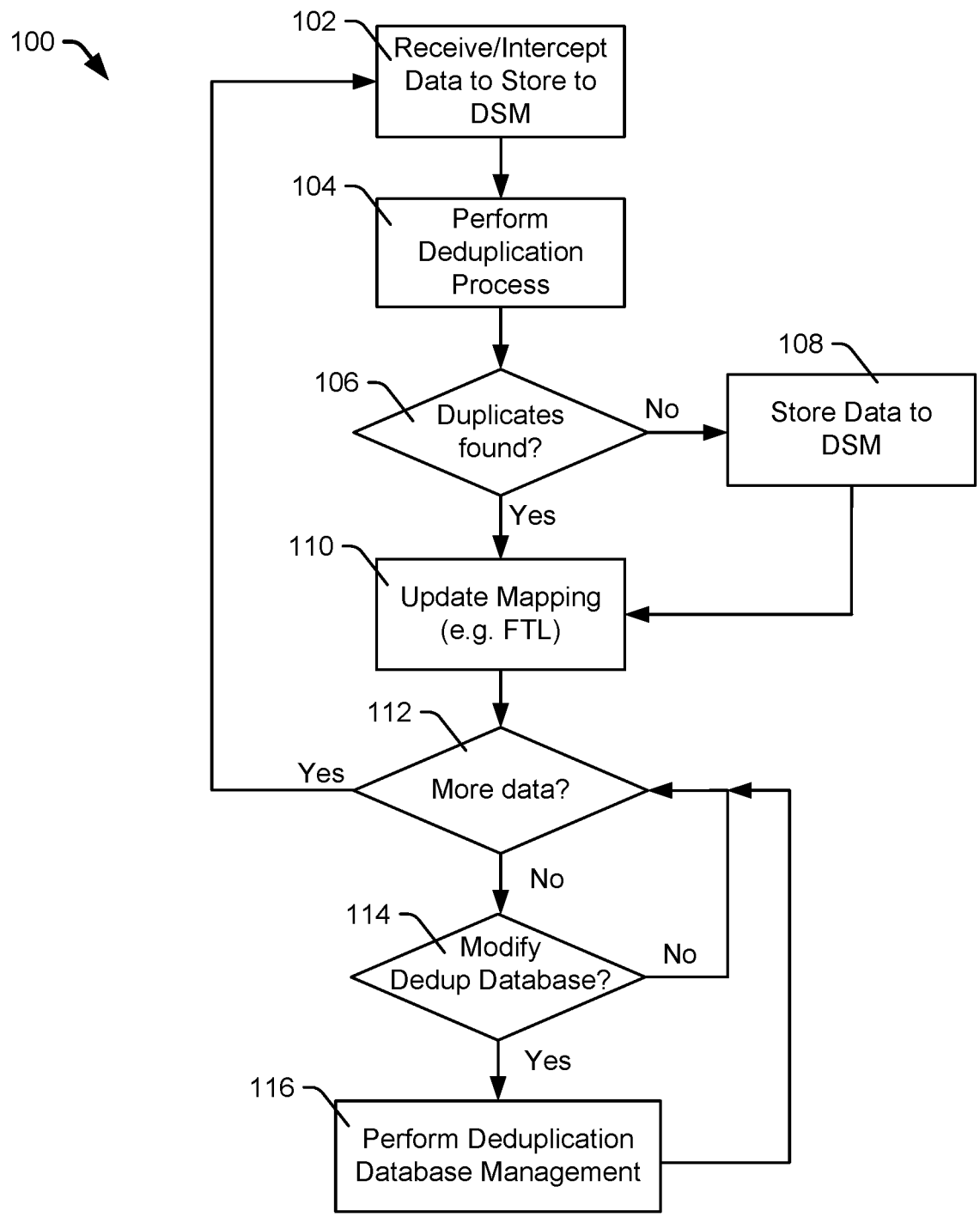
FIG. 1 is a method flow diagram of a system configured to employ multiple duration deduplication entries, in accordance with certain embodiments of the present disclosure.

Referring to FIG. 1, a method flow diagram of a system configured to employ multiple duration deduplication entries is shown and generally designated 100, in accordance with certain embodiments of the present disclosure. Specifically, FIG. 1 provides examples of a database deduplication management method that may be performed by a data processing device, such as a host computer, data storage device, server, processor, or controller. The method 100 can be used to reduce the amount of data stored, the amount of writes to a data storage system, or to reduce a size of a deduplication database, or a combination thereof.

The method 100 can include receiving data to store to a data storage medium, at 102. The data may be received at a data storage device, server, computer, or other device that is configured to execute the functions of the method 100. The data storage medium may be an individual data storage device, an array of data storage devices, or one or more data storage servers, such as a distributed data storage system. A data deduplication process may be performed on the data, at 104. The data deduplication process may execute a hash duplication module to compare newly received data to existing data to determine if there are matches or redundancy between data. The comparison may be made on any granularity of amount of data, however the method may be configured based on efficiency and resources available.

The data deduplication process may be based on a hash of the received data compared to an existing hash database (e.g. a database that stores hash values generated from specific data), which may also be referred to as a deduplication database. The database may be populated with hash pages, hash entries, database entries, or other data structures containing metadata about data stored to the data storage medium. The metadata may include a hash value derived from performing a hashing operation on the stored data. The method 100 may compare a newly calculated hash, such as for newly received data, to the hash database to look for a match within the database. When duplicate data is not found, such as no existing duplicate hash in the hash database, at 106, the data may be stored to a data storage medium, at 108.

When a duplication match is found, at 106, a mapping table, such as a flash translation layer or physical to logical address mapping table, may be updated to logically associate a logical address of the received data with the pre-existing duplicate data already stored in a data storage medium, at 110. This can be done without storing the data associated with the duplicate hash to the data storage medium; thus, potentially saving space within the data storage medium or reducing a number of storage operations to the data storage medium.

The system may perform the deduplication process for more data, at 112. The process may be performed for all data intended to be stored to the data storage medium, or may be performed for a subset of the data intended to be stored to the data storage medium. In addition to the deduplication process described herein, the method 100 may also include a deduplication database management process, at 114 and 116.

The deduplication database management process may include a trigger, at 114, to determine whether to perform deduplication database management, at 116. Examples of the trigger may include a timer, an indicator of resources available, a user initiated trigger, or another trigger or flag. For example, the deduplication database management process may be run as a background process when the system has unused resources available to run the process, which may be run periodically when such resources area available. In some instances, the deduplication database management process may be initiated once a data storage system has been in an idle mode for a certain period of time, after a specific number of storage operations has occurred, when a certain amount of resources are available, or a combination thereof. In some embodiments, the descriptions of the deduplication process described herein can be performed inline as part of a current write process; for example, the system could execute some or all of the deduplication functions during performance of a write/store data process rather than as a background process. Also, the systems and methods described herein may execute the deduplication process(es) inline as part of a store data process and also during a background process; for example, the functions thereof can be selectively assigned when to execute during the inline process versus background process based on an analysis of the benefits to the goals of a specific system.

The deduplication database management process may include a deduplication database trimming process, which may include one or more operations to reduce the size (e.g. the amount of data space the database occupies or a number of items stored within the database) of the deduplication database. In some examples, the trimming process can trim unique data from the deduplication database to make the size of the database(s) smaller. The trimming process may also trim data that is duplicate data depending on its ability to find duplicates. For example, if data set A is written, then the database will be filled with information (e.g. hash entries) relating to data set A. Then if data set A is written again, all entries in the database will become a duplicate. Then if data sets B, C, or D, etc. are written, nothing will be a duplicate entry since information for data set A is in the database and nothing else is. In this scenario, the database can be trimmed of the information related to data set A if the system has not seen any duplicates of data set A in some period of time.

In a deduplication database (e.g. a database that stores hash values generated from specific data) for a large data storage system, the total number of hash entries can be very large and impractical to search through. The database can be designed to store up to a maximum number of entries and after that the performance of the database drops significantly. The reason for the drop in performance is that once the data set grows outside of the bounds of the system memory the persistent media may need to be consulted for every data access which greatly slows things down. Alternatively, certain portion of a hash database (e.g. all of a type of metadata used for initial data duplication evaluations) may be stored entirely within the system memory, which may require an increasingly large portion of the memory and reduce the amount of memory available for other tasks, thereby degrading system performance.

To solve these problems, as well as others, the database design can include an indicator for every entry that indicates an age associated with the respective entry. Then, for example, a process can search through the database looking for entries that have not had a duplicate within a certain amount of time. There may be a strong temporal component of data duplication, with duplicate data most likely to occur within a limited time interval. Those entries that have not had a duplicate within a certain amount of time may be unlikely to become duplicates and are selected to be removed from the database. This process and database design can be configured to keep the size of the database smaller, maintain a certain performance profile, or stay within the bounds of the hardware, or any combination thereof.

Figure 2:
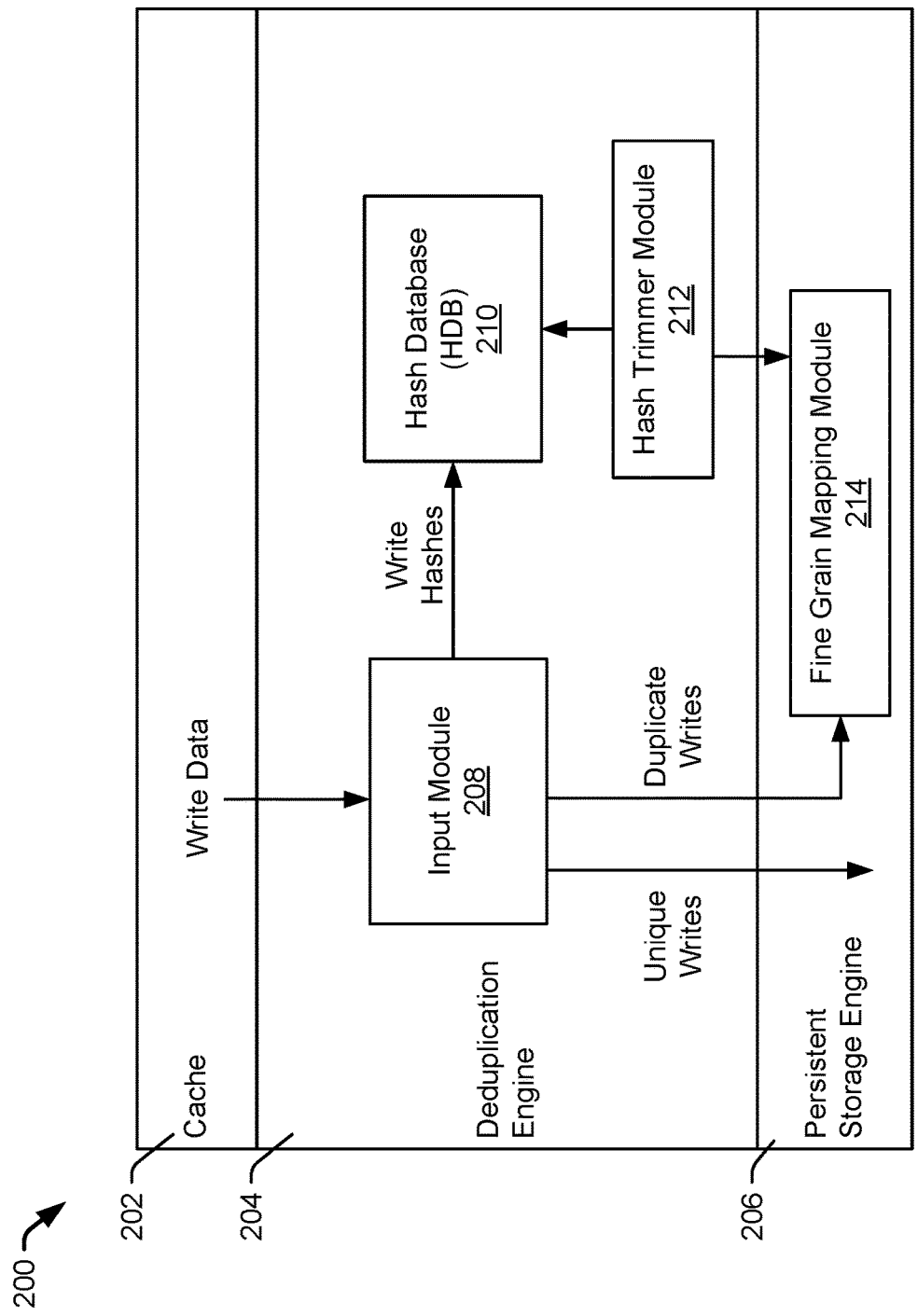
FIG. 2 is a diagram of a system configured to employ multiple duration deduplication entries, in accordance with certain embodiments of the present disclosure.

Referring to FIG. 2, a diagram of a system configured to employ multiple duration deduplication entries is shown and generally designated 200, in accordance with certain embodiments of the present disclosure. The system 200 can perform the functions, processes, and methods described herein. The system 200 can include a cache 202, a deduplication engine (e.g. including a hash duplication module) 204, and a persistent storage engine 206. The deduplication engine 204 and persistent storage engine 206 may be any combination of processor(s), controller(s), logic circuit(s), or firmware that can perform the functions described herein. The deduplication engine 204 can include an input module 208, a hash database (HDB) 210, sometimes called a deduplication database, and a hash trimmer module 212. The persistent storage engine 206 may include a fine grain mapping module 214.

The cache 202 may store write data received at the system 200 to be stored to persistent storage, such as a nonvolatile data storage medium. The input module 208 may calculate a hash for all write data received to be stored to the persistent data. The input module 208 may also check the HDB 210 for matches and perform a data comparison to confirm a match between a write data hash and an existing hash in the HDB 210. The input module 208 may store new unique write hashes to the hash database 210. The input module 208 may send unique writes (e.g. writes for which no match was found in the HDB 210) to the persistent storage engine 206 for storage to a persistent storage medium. The input module 208 may send duplicate writes, identified based on locating a duplicate hash value in the HDB 210, to the fine grain mapping module 214.

In some examples, the fine grain mapping module 214 may utilize a fine grain mapping function to map logical block addresses to physical block addresses, such as user logical block addresses (uLBAs) to physical logical block addresses (pLBAs); such can allow for multiple uLBAs to map to the same pLBA. In this manner multiple duplicative data writes, each having unique uLBAs, can be mapped to a single pLBA.

The hash trimmer module 212 may include a deduplication database trimming process, which may execute one or more operations to reduce a size of the hash database 210. The trimming process can trim unique data from the deduplication database 210 to make the size of the database smaller. In some examples, the trimming process may periodically remove entries from the HDB 210 when the entries selected for removal have not had a duplicate data match from received write data within a certain period of time. The period of time may be based on a number of operations executed, a timer, or a system clock.

Figure 3:
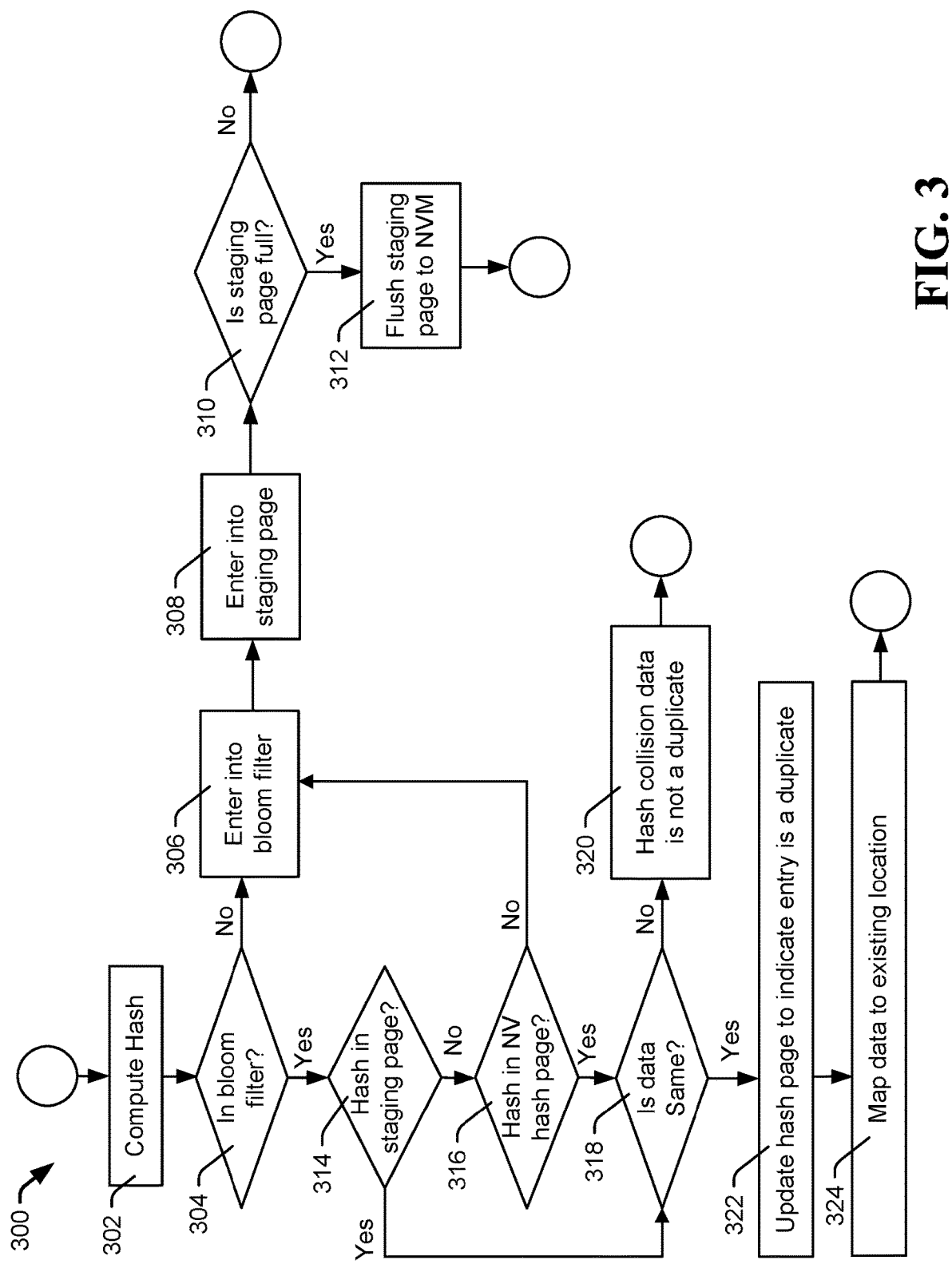
FIG. 3 is a method flow diagram of a system configured to employ multiple duration deduplication entries, in accordance with certain embodiments of the present disclosure.

Referring to FIG. 3, a method flow diagram of a system configured to employ multiple duration deduplication entries is shown and generally designated 300, in accordance with certain embodiments of the present disclosure. Method 300 provides examples of a data deduplication process that can be used with the systems and methods described herein. For example, the method 300 can be performed for write data received in a cache of a data storage system, such as shown in FIG. 2.

The method 300 may compute a hash value for data, such as received write data, at 302. The hash value may be computed using any known hash function. The method 300 may then determine if the hash value exists or may exist in the hash database, at 304, such as by using a Bloom filter. A Bloom Filter, may be a data structure that can be used to check for membership of an element in a set of elements, which may provide false positives but not false negatives. For example, comparing a hash value to a Bloom filter may return results of "possibly in the HDB" or "definitely not in the HDB." When the hash value is not in the Bloom filter, at 304, the method 300 may enter the hash value as a new entry in the HDB, including entering the hash into the Bloom Filter, at 306. Once the new entry is entered into the Bloom Filter, the method 300 may enter the unique hash into a staging page, 308. A portion of metadata of the HDB, such as hash pages containing unique hash values, may be stored to a storage medium, such as a nonvolatile memory (NVM). A staging page may be an amount of metadata stored in a cache memory prior to writing the data to the NVM, which may reduce the number of input/output (I/O) operations required to maintain a portion of the HDB in the NVM. When the staging page has reached a certain amount of data, at 310, the staging page may be written, or flushed, to the NVM, at 312, to update the HDB in the NVM. If the staging page is not at a capacity to write to NVM, the process can await more data to put in the staging page.

When a match in the hash database is detected, at 304, such as via a Bloom filter, the method 300 may determine if the selected hash value is present in a current staging page, e.g. stored at the cache, at 314. When the hash value is not present in a current staging page, the method 300 may determine if the hash value is in a nonvolatile (NV) hash page, at 316. When the hash value is not in a NV hash page, it may indicate a false positive from the Bloom filter at 304, and accordingly the hash value may be entered into the Bloom filter, at 306.

When the hash value is in the staging page, at 314, or is in the NV hash page, at 316, the method 300 may determine if the new write data corresponding to the hash value matches the data corresponding to the hash database entry. When the hash value of new write data matches a hash value in the HDB corresponding to previously stored data, it may be considered a "hash collision". While rare, two different unique data chunks may produce an identical hash value, and therefore hash collisions mean the new data is probably, but not necessarily, duplicate data. To ensure the new data is a duplicate, it may be compared against the data associated with the hash for which there was a collision. When the new data is not the same as the data corresponding to a hash collision, at 318, the data is indicated as not a duplicate, at 320, and the process ends. In some embodiments, a new HDB entry may be generated for the new unique write data. When the data corresponding to the hash value is the same as data corresponding to a hash collision, at 318, the corresponding hash page entry in the HDB may be updated to indicate the entry is a duplicate, at 322, and the method 300 may map the write data corresponding to the hash collision to an existing data location, at 324. In some embodiments, if two pieces of data have the same hash value but are not duplicate data, then the data received second will not initiate a deduplication of the first received data. Further, the hash value corresponding to the second received data may not be added to the hash database.

Figure 4:
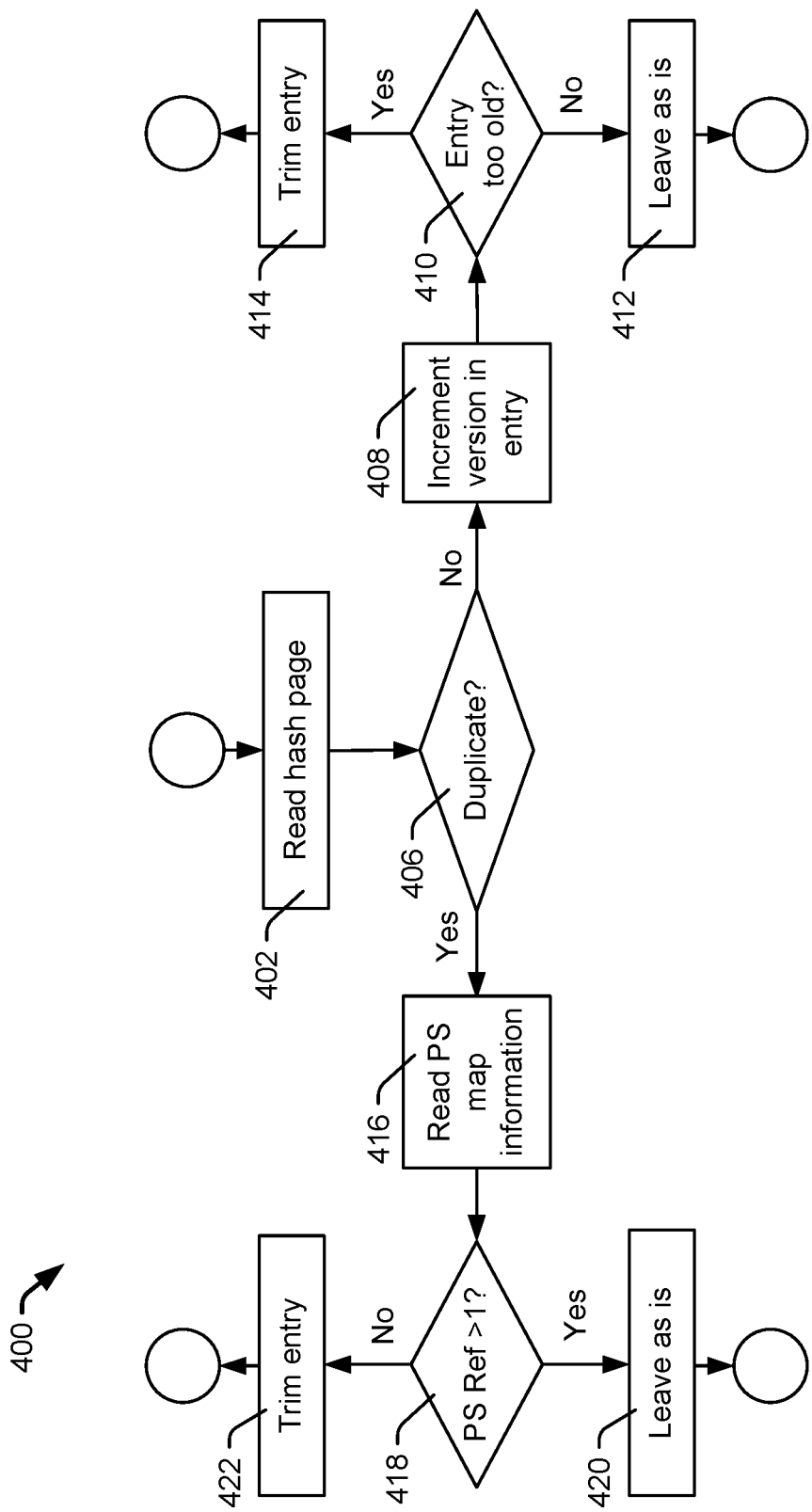
FIG. 4 is a method flow diagram of a system configured to employ multiple duration deduplication entries, in accordance with certain embodiments of the present disclosure.

Referring to FIG. 4, a method flow diagram of a system configured to employ multiple duration deduplication entries is shown and generally designated 400, in accordance with certain embodiments of the present disclosure. Method 400 provides examples of a hash database trimming process that can be used with the systems and methods described herein. For example, the method 400 can be performed by a trimming module for a hash database in a deduplication process, such as in FIG. 1, FIG. 2, or FIG. 3.

The method 400 may be triggered based on a timer, a counter, a workload of a processing system, a user or host initiated command, or another type of trigger. In some examples, a write operation counter or countdown timer may be utilized to trigger the method 400 to start periodically. For example a trimming operation may be performed at set time intervals (e.g. four times a day in six hour intervals).

The method 400 may include reading a selected hash page from a hash database, at 402, and determining if the hash page corresponds to duplicate data (e.g. more than one uLBA points to a pLBA storing data corresponding to the hash page), at 406. In some examples, the hash database or the hash page may store an indicator of whether a duplicate hash was detected, which can be read by a trimming module. The indicator may also indicate a number of times a duplicate of the corresponding data has been detected. An example of such is provided in FIG. 5.

When the hash entry does not correspond to duplicated data, at 406, a counter or version metadata value may be incremented to count the number of times the hash trimming method 400 has examined or scanned the selected hash entry, at 408. The counter may be stored to the hash database for the selected hash entry; and as in the example in FIG. 5, an entry-specific counter can be part of each hash entry in the hash database.

When the selected hash entry does not correspond to duplicate data, the method 400 may determine if the entry is old enough to remove from the database, at 410, which may be done based on a timer or a counter. In some examples, the counter associated with each hash entry may provide each entry with a relative temporal component that can be compared against a threshold to determine a relative age of the entry. When the counter is above a threshold, the entry may be removed from the hash database, at 414. When the counter is not above a threshold, the entry may remain in the hash database, at 412. In some instances, the counter may be a time stamp that can be compared against a timer to determine a relative age of an entry. Thus, the counter may be utilized to perform a temporal comparison by comparing the counter value stored in the hash database for a selected entry to a threshold value, where a corresponding entry can be removed from the hash database based on the threshold value.

When the method 400 detects the selected hash page corresponds to duplicated data, at 406, mapping information (e.g. flash translation layer, LBA-to-PBA map, or other persistent storage (PS) mapping system) for the data corresponding to the hash entry may be retrieved from a memory. The mapping information may be evaluated to determine if there are multiple uLBAs mapped to the pLBA corresponding to the hash entry, at 418. For example, the mapping information could be consulted to determine if the number of user logical addresses referencing the same PS physical location is greater than one, at 418. This can be a double check by the method 400 to determine if the data is still a duplicate, as situations could arise where data that once was a duplicate is no longer a duplicate and is now unique data (e.g. the duplicate copies were deleted) that could have an associated entry trimmed from the hash database. When there are still duplicates, at 418, the associated entry may remain in the hash database, at 420. When there are no actual duplicates, at 418, the associated entry may be removed from the hash database, at 422. Depending on implementation, the non-duplicated entry may be maintained in the database until it is older than the removal threshold (e.g., the method 400 may proceed from a "yes" determination at 418 to the age incrementing step at 408).

The method 400 may execute for every hash entry in the hash database, or may execute for a selected subsets of entries. The trimming method 400 may be executed periodically, such as after a predetermined amount of time has elapsed or after a specific number of write operations has occurred. The trimming method 400 could also be triggered to be executed manually by a request from a user or another device. Also, such could be triggered to execute based on available storage capacities or size thresholds of the HDB, a data storage space, or any combination thereof.

Figure 5:
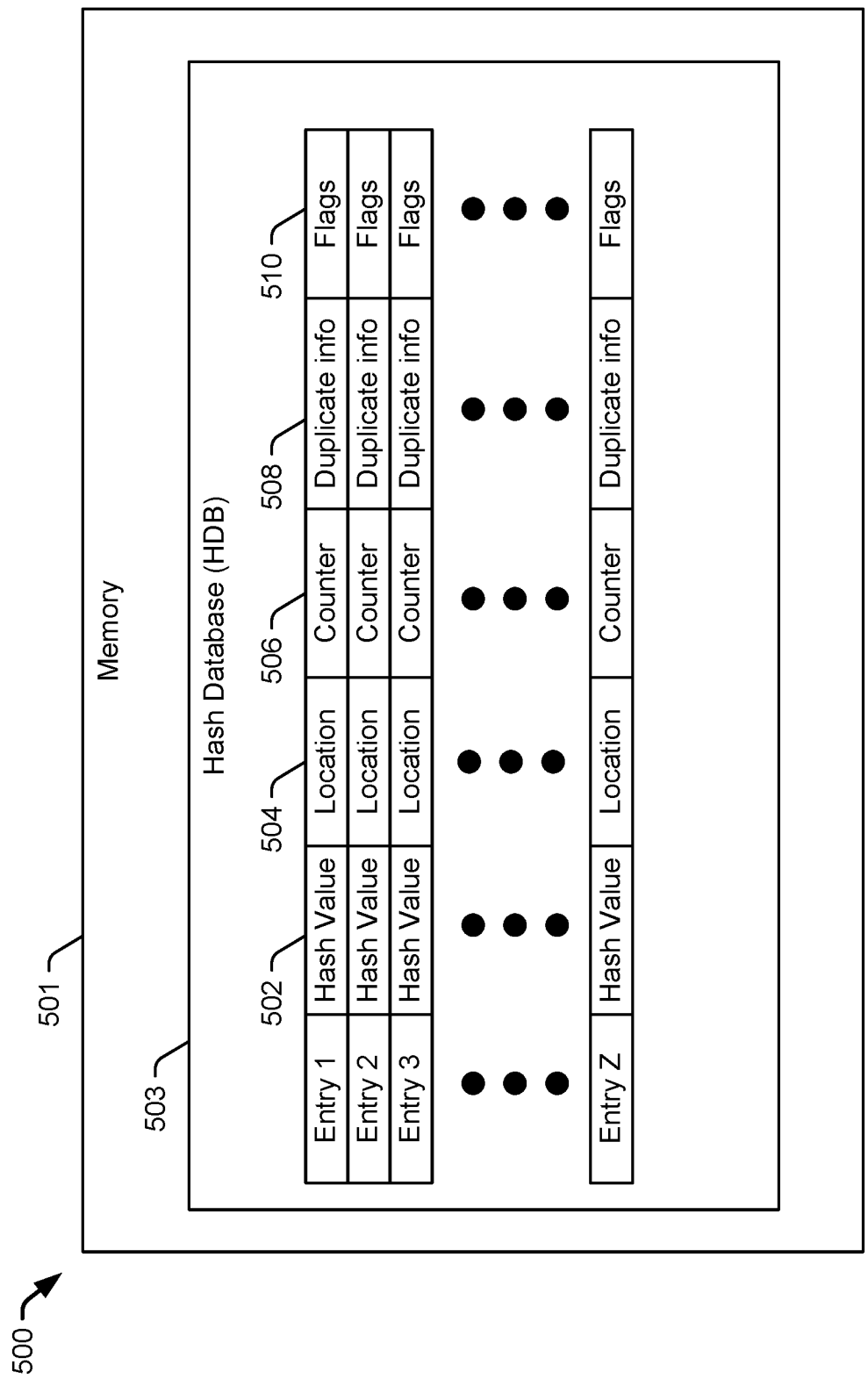
FIG. 5 is a diagram of a system configured to employ multiple duration deduplication entries, in accordance with certain embodiments of the present disclosure.

Referring to FIG. 5, a diagram of a system configured to employ multiple duration deduplication entries is shown and generally designated 500, in accordance with certain embodiments of the present disclosure. The system 500 can include a memory 501 that can store a hash database 503, which may be used with the systems and methods described herein. The memory 501 may include one or more physical memories, including any combination of volatile and non-volatile memory, and different portions of the HDB 503 may be stored to different memories. The hash database 503 may include an entry corresponding to each hash value 502 stored therein. The database 503 may also include location information 504, such as a physical logical block address, associated with the data the corresponding hash value was generated from.

The database 503 may also include a counter 506, sometimes called a version value, for each hash entry that can be utilized by the systems described herein to store data indicating a relative time relationship. For example, the counter 506 may store a count of a number of times a database trimming process has been executed while the hash entry has been stored in the database 503. The counter 506 can also indicate whether data is unique or a match has been detected.

The database 503 may also include duplicate information 508 that can be utilized by the systems described herein to store data indicating whether an entry corresponds to duplicated data. The duplicate information 508 may also store a number of times, or an estimate of a number of times, a duplicate has occurred. Further, the database 503 may also store one or more flag indicators 510 to allow the system to perform other functions, such as an indicator to determine what data to keep in the database during the trimming process. In some embodiments, a single field of a database entry may serve multiple purposes. For example, the counter or version 506 may be an 8-bit value, with values from 0-127 indicating a number of times the entry has been scanned during a trimming operation. Values from 0-127 may also indicate the corresponding data is unique, since once data is duplicated the corresponding hash value may not be aged out, and trimming operations may no longer need to be counted. Values from 128-255 may provide information corresponding to duplicate info 508, such as whether the corresponding data has been duplicated and an amount of duplicates.

Figure 6:
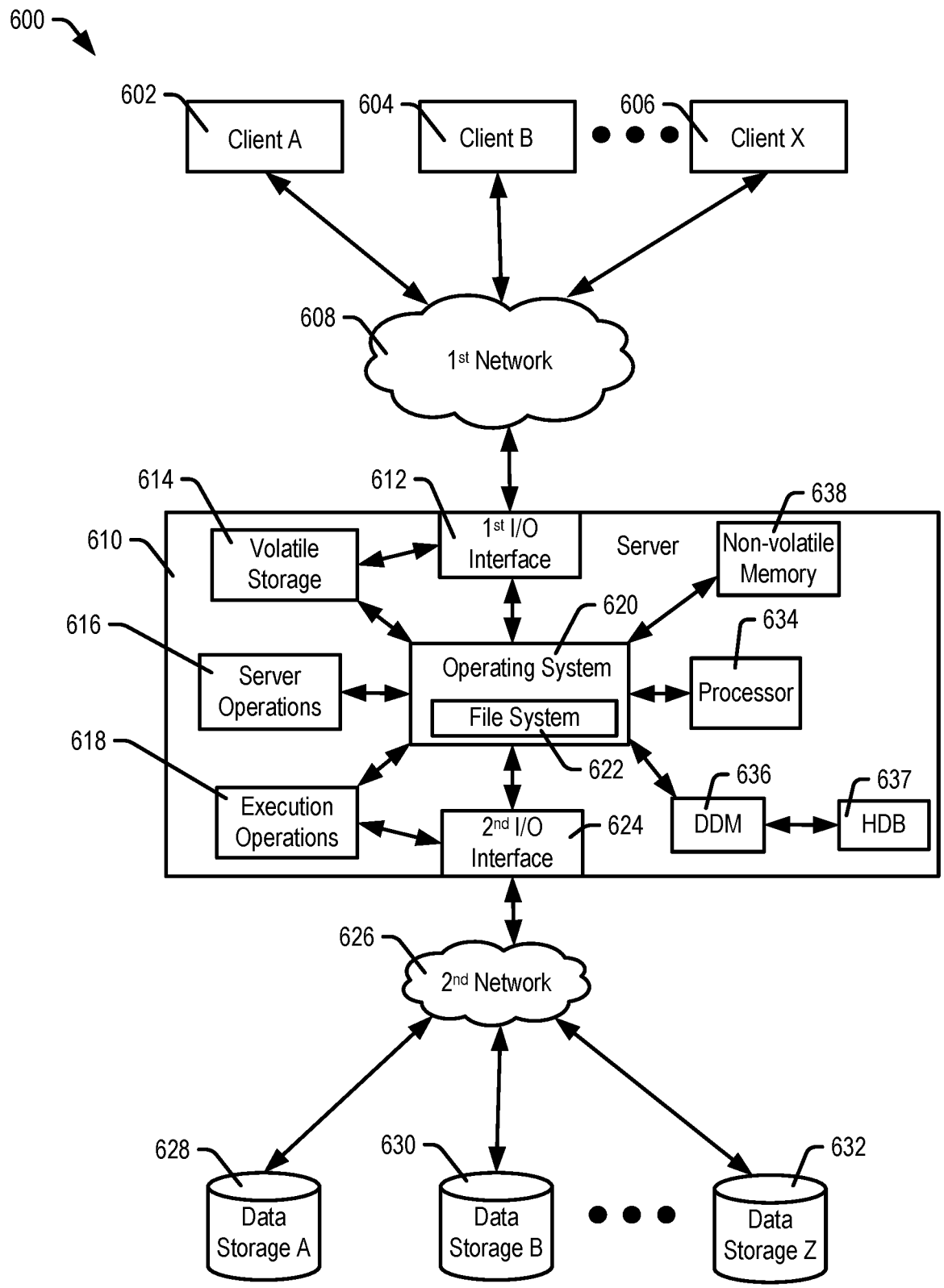
FIG. 6 is a diagram of a system configured to employ multiple duration deduplication entries, in accordance with certain embodiments of the present disclosure.

Referring to FIG. 6, certain embodiments of a system configured to employ multiple duration deduplication entries are shown and generally designated 600. System 600 can incorporate and execute the systems and methods described herein. The system 600 can include client A 602, client B 604, and client X 606, as well as any number of other clients, and may communicate with server 610 via a first network 608.

The server 610 can include a first input/output (I/O) interface 612, volatile storage 614, server node operation instruction module 616, client operations execution module 618, operating system 620, file system 622, processor 634, deduplication database management module (DDM) 636, hash database (HDB) 637, non-volatile memory 638, and second I/O interface 624. The HDB 637 may be stored to the volatile memory 614, the non-volatile memory 638, to other data storage mediums, or any combination thereof. The second I/O interface 624 may be coupled to arrays of data storage A 628, B 630, or Z 632 via a second network 626. While server 610 is referred to as a server, server 610 may be any type of computer processing device that allows for the functions of the DDM 636 and the HDB 637 to be performed, such as a host computer, data storage device, data storage controller, hardware logic, other devices, or any combination thereof.

In some examples, the file system 622 can be configured to perform data operations corresponding to data in the arrays of data storage A 628, B 630, or Z 632 based on requests from the clients A 602, B 604, or X 606. Various configurations of data storage may be used for the physical storage of data for the clients A 602, B 604, or X 606, as well as various levels of virtualization (e.g. groupings or associations of the data logically at the server 610 level). The DDM can interact with the file system 622 when data is received to store to any of the data storage A 628, B 630, or Z 632 to perform the deduplication management functions described herein, such as the duplication determination functions and the HDB trimming functions.

During operation, when a client sends an operation request, the first I/O interface 612 can receive the file operation request, the processor 634 can store the file operation request to a list of ordered operation requests, such as in the volatile storage 614. When resources are available, the file system 622 can direct the processor 634 to process the file operation requests via the execution operations module 618. The operations execution module 618 can perform data operations to retrieve, store, update, modify, create, delete (or any other operation) data in the arrays of data storage A 628, B 630, or Z 632, or any combination thereof. The server operations module 616 can manage faults, schedule tasks, manage power, monitor network traffic, or perform other operations.

Figure 7:
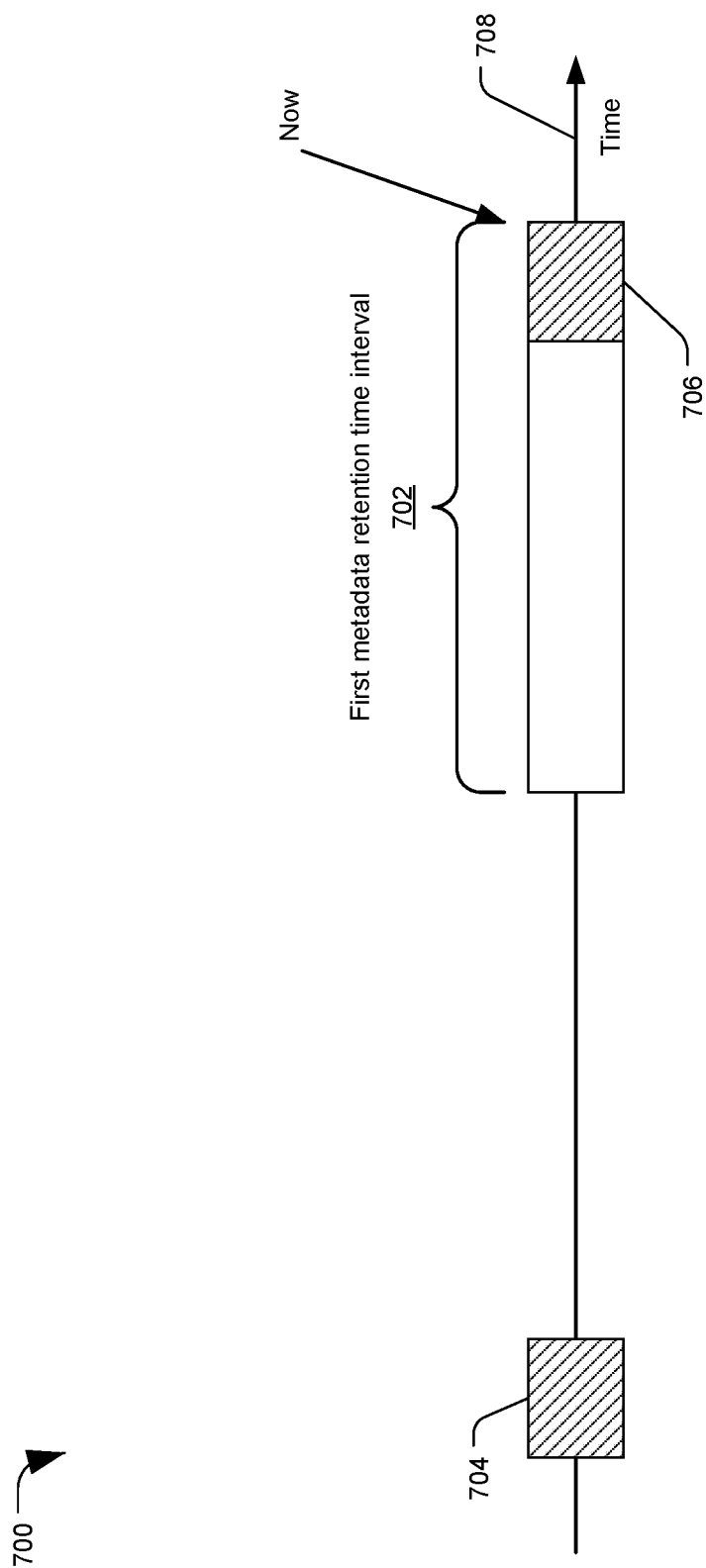
FIG. 7 is a diagram of a system configured to employ multiple duration deduplication entries, in accordance with certain embodiments of the present disclosure.

FIG. 7 depicts a diagram 700 of a system configured to employ multiple duration deduplication entries, in accordance with certain embodiments of the present disclosure. As discussed above, a data deduplication system may maintain entries in a deduplication hash database for a particular period (e.g. a time period or a certain number of database trimming operations, etc). The hash database entries may comprise metadata for stored user data (e.g. a hash of the user data, a storage location of the user data, etc.), and can be used to identify if any duplicate user data is received for storage. Diagram 700 depicts a timeline 708 for the deduplication system. Hash database metadata entries may be retained in the database for unique data (e.g. data for which duplicates have not been identified) for a for a first metadata retention time interval 702. For example, the time interval may be for one day, or for four trimming processes performed to identify hash entries for unique data that can be removed. As most duplicated data may be duplicated within this first time interval 702, most data duplications may be identified within this period while limiting the size of the hash database and increasing the speed of deduplication searches, thereby improving system performance over systems that retain larger deduplication databases.

However, certain events or operations may generate duplicate data at longer intervals than the first metadata retention time interval 702. For example, while the first metadata retention time interval 702 may be, e.g., a day in duration, system backups may be performed once per week, and may generate substantial duplicate data. For example, if a first system backup 704 was performed in the past and its corresponding hash entries have been expunged from the database due to being outside the first time interval 702, a second system backup 706 may not generate any duplicate data collisions in the database, even though data duplicative with the first backup 704 is being stored. To address this issue, periodically certain hash entries may be flagged as "sampled" entries and retained for a longer time period. A sampled entry may be an entry that is retained in the hash database for an extended time period or duration compared to a first, standard retention period 702. This process is addressed in greater detail in regard to FIG. 8.

Figure 8:
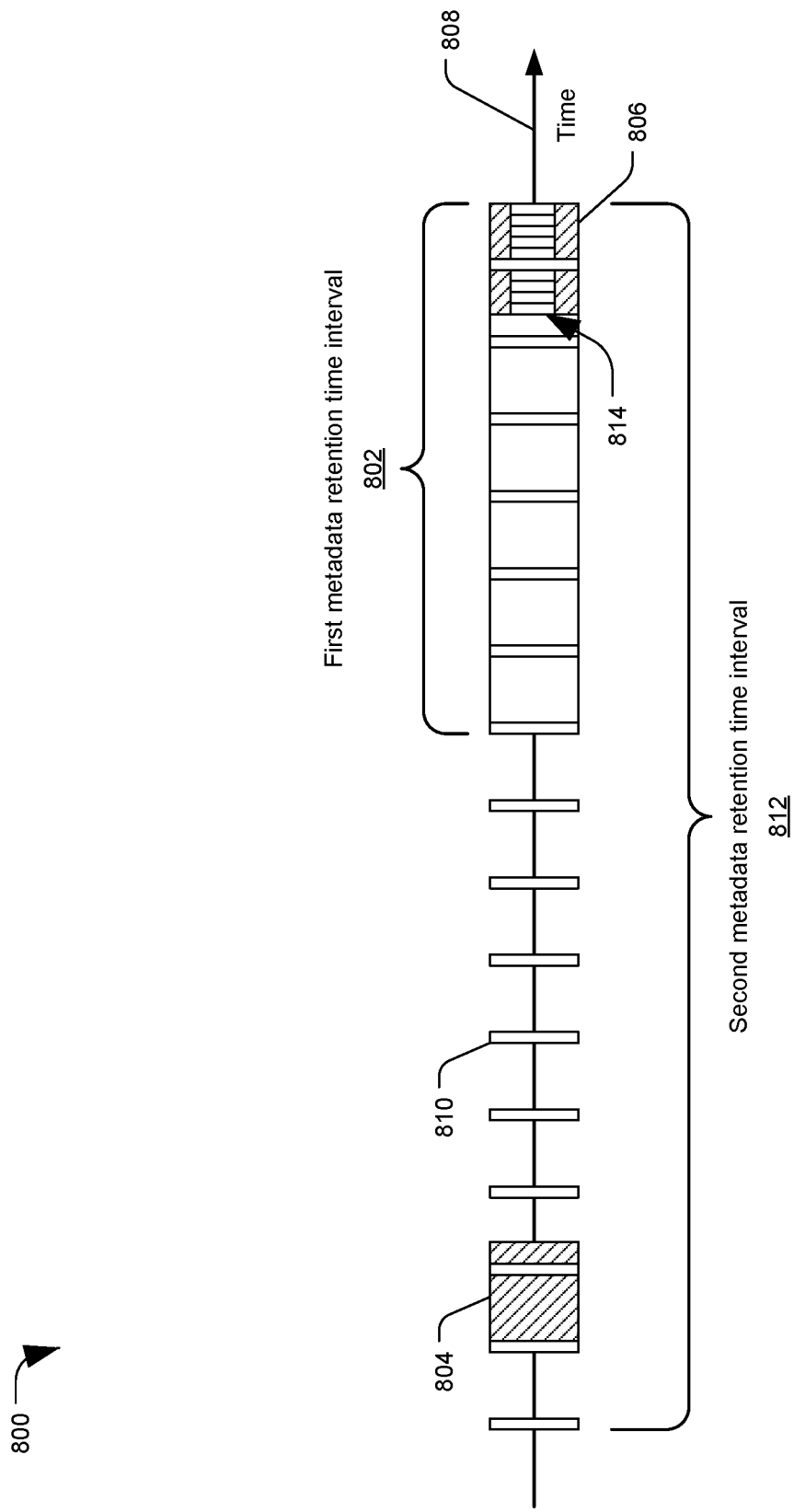
FIG. 8 is a diagram of a system configured to employ multiple duration deduplication entries, in accordance with certain embodiments of the present disclosure.

FIG. 8 depicts a diagram 800 of a system configured to employ multiple duration deduplication entries, in accordance with certain embodiments of the present disclosure. Diagram 800 depicts the time line 808 and the first metadata retention time interval 802. In addition to storing hash entries for all unique data writes during the first time interval 802, the system may also periodically designate certain hash entries as "sampled" entries 810 that are retained for a second metadata retention time interval 812 longer than the first interval 802. For example, a set number of entries per a selected time interval (e.g. one entry per second or minute), or a certain number of entries per a selected amount of data (e.g. X entries per Y megabytes of data, or per Y megabytes of new unique entries) may be designated as sampled entries 810. If the first time interval 802 is for, e.g. a day, the second time interval 812 may be for, e.g. a week or a month.

Although a first time interval 802 and a second time interval 812 are depicted in diagram 800, additional time intervals may also be set. For example, 90 out of 100 entries may be non-sampled and retained for a shortest time interval, 8 out of 100 entries may be sampled and retained for a medium time interval, and 2 out of 100 entries may be sampled and retained for a long time interval.

A first indicator may be set for entries that are to be retained for the first time interval 802, and a second indicator may be set for entries that are to be retained for the second time interval 812. For example, a flag may be stored to each hash entry, with a 0 indicating a non-sampled entry that is to be retained for the first time interval 802, and a 1 indicating a sampled entry that is to be maintained for the second time interval 812.

In the depicted embodiment, a number of sampled entries 810 may have been stored to the hash database during a first system backup 804. Due to the longer second time interval 812, those sample entries 810 may still be in the database when the second system backup 806 is performed, and therefore duplicated data may be detected from the sampled entries.

When a duplicate data collision is detected for a sampled entry, the system may perform various options to attempt to detect other duplicate data proximate to the sampled entry, or to monitor for future data duplication proximate to the detected collision.

For example, one option may be to perform reads to data stored near to the data corresponding to the sampled entry for which a collision was detected, and create hash database entries for the read data. Data stored "near" the sampled data may refer to data stored close to the sampled data physically (e.g. with close physical storage addresses) or temporally (data stored at a similar time as the sampled data, even if stored to a physically separated location). The system may read forward and back from the sampled data. In the depicted embodiment of FIG. 8, these reads may be used to generate additional hash database entries for data stored during the first system backup 804. With the new entries in the database, additional collisions may be detected from the second backup 806, from future backups, or both.

Another option to detect additional data duplication, which may be performed alone or in conjunction with the previous option, may include designating a next "N" database entries 814 ("N" being an integer value) as sampled entries after detecting a collision with a sampled entry. If employed alone, this option may not catch all the duplicated data between the first backup 804 and the second backup 806, but will likely catch duplicates with future backups, and may require less time and system resources than performing reads to a nonvolatile memory and generating new hash entries for previously stored data. An embodiment of this option is discussed in greater detail in regard to FIG. 9.

Figure 9:
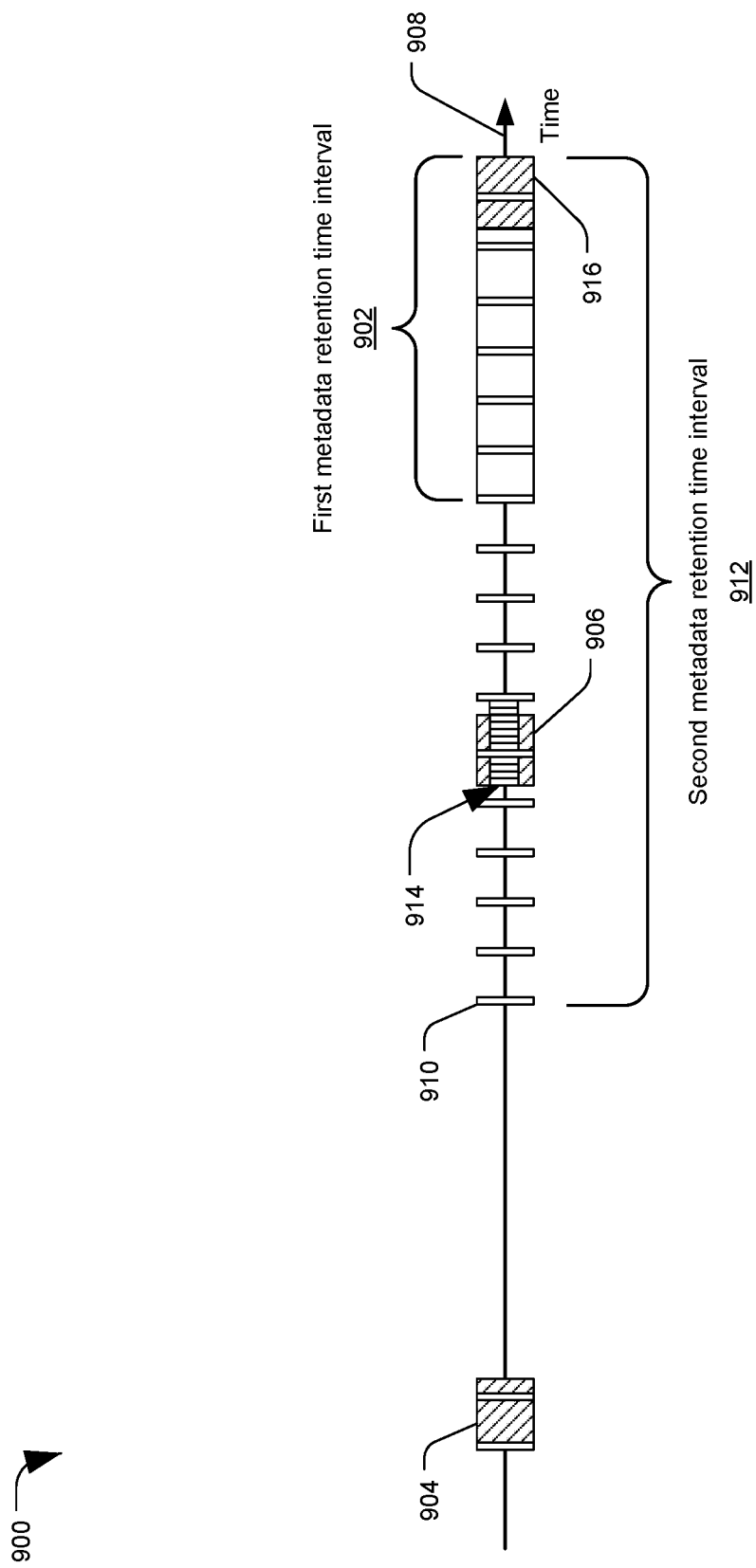
FIG. 9 is a diagram of a system configured to employ multiple duration deduplication entries, in accordance with certain embodiments of the present disclosure.

FIG. 9 depicts a diagram 900 of a system configured to employ multiple duration deduplication entries, in accordance with certain embodiments of the present disclosure. Diagram 900 shows a later period along the timeline 908 than shown in FIG. 8. The first data backup 904 is now outside of both the first metadata retention time interval 902 and the second metadata retention time interval 912. Therefore, even the sampled entries after the first backup 904 but outside the second time interval 912 have been removed from the deduplication hash database. However, the sampled entries taken during the first backup 904 may be retained, due to the system having found duplicate data for those entries during the second backup 906. This is because hash database entries for which data duplicates have been found may be updated to indicate they are duplicated entries, and may no longer be aged out of the database.

As in FIG. 8, additional entries were marked as sampled entries 914 after encountering a data duplication with a sampled entry during the second data backup 906. Accordingly, when a third data backup 916 is performed, the system may catch many duplicated data entries from the sampled entries taken during the second data backup 906.

As stated above, hash database entries for which data duplicates have been found may be updated to indicate they are duplicated entries, and may no longer be aged out of the database. In some embodiments, sampled entries may retain their sampled status even after duplicates are found for that entry. This may mean that if another duplicate is encountered in the future for an existing duplicate sampled entry, the next N entries may be marked as sampled entries as well. This may allow the system to catch duplicates when some data entries change between system backups, even when those changed entries are surrounded temporally by established duplicate entries rather than non-duplicated sampled entries. For example, a duplicate may be detected during the third data backup 916 for a sampled entry 914 from the second data backup 906. That sample may now be flagged as a duplicate and not aged out, and may also still be marked as a sampled entry. If another duplicate for the duplicated sampled entry is encountered during a fourth data backup, but the data following the duplicated sample entry changes between the third data backup 916 and a fourth data backup, the changed data may be marked as sampled due to being within N entries following the duplicated sampled entry.

While examples provided herein have been of system backup operations, other operations may also have longer temporal gaps between duplicates than would be caught by the first time interval 902. The lengths of the various intervals for which to retain sampled and unsampled entries, and the number of entries 914 to mark as sampled after encountering a duplicate of a sampled entry may depend on the types of data and workloads being processed by the system, and may be set by a manufacturer or by a user of the system.

Figure 10:
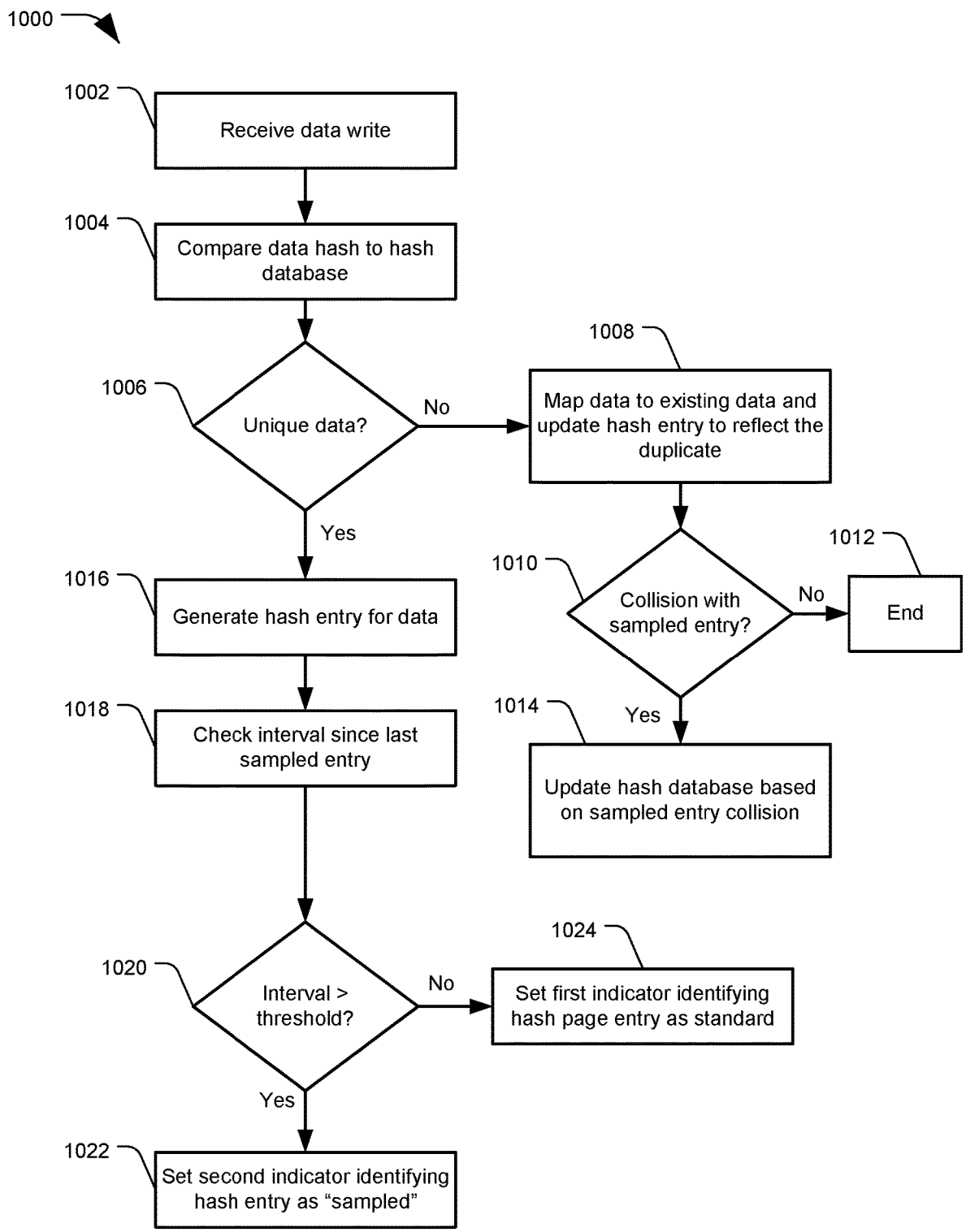
FIG. 10 is a method flow diagram of a system configured to employ multiple duration deduplication entries, in accordance with certain embodiments of the present disclosure.

Turning now to FIG. 10, is a method 1000 flow diagram of a system configured to employ multiple duration deduplication entries is depicted, in accordance with certain embodiments of the present disclosure. The method 1000 may depict an example process by which the system evaluates a write flow against a deduplication hash database configured to maintain temporally limited entries, including longer-duration sampled entries. The method 1000 may be performed by a deduplication engine 204 of FIG. 2, a deduplication database management module (DDM) 636 of FIG. 6, or by other processors, controllers, or software or hardware components.

The method 1000 may include receiving a data write, at 1002. For example, the data write may include a write command from a host system, which may include data that are to be evaluated for duplicate data against a hash database. The data from the data write may be divided into chunks, and a hash algorithm may be applied to the data chunks to produce hash entries.

The method may include comparing the data hash entries to the hash database, at 1004, to search for a conflicting or matching hash value (e.g. a "collision") that may indicate duplicate data. In some embodiments, a hash collision may indicate only a possibility of duplicate data, and the stored data must be compared against the new write data to verify data duplication. The method 1000 may include determining whether the data is unique, at 1006.

If the data is not unique, the new write data may be mapped to the existing previously stored data, and the hash entry for the existing data may be updated to indicate multiple user data entries map to the same stored data, at 1008. For example, in the case of duplicated data, multiple user logical block addresses (uLBAs) may be mapped to the same physical LBA (pLBA) of the storage medium. This duplication may be indicated in the hash database entry for the stored data by, e.g., updating a "counter" or "duplicate info" fields to represent whether there are duplicates and an amount of duplicates for the data.

In addition to determining whether the data was a duplicate and updating the hash entry accordingly, the method 1000 may include determining whether the collision was with a sampled entry, at 1010. For example, sampled hash entries may have a flag (e.g. a 0 or 1 bit value) indicating whether the entry is a "sampled" entry intended to be retained in the hash database longer than a standard, shorter time interval. If the entry is not a sampled entry, the method 1000 may end, at 1012.

If the entry was a sampled entry, at 1010, the method 1000 may include updating the hash database based on the sampled entry collision 1014. The database may be updated in order to detect other duplicate data near to the sampled data collision. For example, a duplicate data collision with a sampled entry may indicate that a process or data storage operation is occurring that is or will create duplicate data to data stored near to the sampled entry. However, the data stored temporally near to the sampled entry may not have entries in the hash database, due to being removed due to age. Accordingly, the system may employ various approaches to determine whether other duplicate data writes have or will occur temporally proximate to the current collision with a sampled entry.

In one approach to updating the hash database based on the sampled entry collision, at 1014, the system may perform reads to data that was stored for a period before and after the sampled data. For example, the system may search forward and backward for writes occurring 1 minute from the sampled data, or for a certain number of data writes from the sampled data. If a sampled data entry is created every X amount of time or data writes, the search may include data written X time before and after the sampled entry. Hash database entries may be created for the read data from the search. Accordingly, the system may be able to compare new incoming data against data that was recorded proximate to the sampled entry, to determine if a cluster of duplicate data is being received. In some embodiments, the system may store a cache for recently received data, so that duplicate data checks can be performed on the recently received data once the reads and new hash entries have been completed. This may prevent duplicate data from "slipping through" before the search and database update can be performed.

Another approach to updating the hash database based on the sampled entry collision, at 1014, may include flagging the next N hash entries as sampled entries. This approach may not catch duplicates with previously stored data near to the collision sampled data, but may catch future duplicates and may be faster and require less system resources than performing a search and read of previously stored data. For example, if the sampled data collision occurred due to a weekly data backup, marking the next, e.g. 100 data entries as sampled entries may allow the system to catch duplicates the next time a data backup is performed.

In some embodiments, a system may employ multiple approaches to updating the hash database to attempt to catch more duplicates. For example, a system may perform reads for data stored before and after the sampled collision data, as well as flag the next N entries as sampled.

Returning to the method 1000, if the received data write is determined to be new or unique data, at 1006, the method may include generating a hash database entry for the data, at 1016. The hash entry may include metadata about the data, including a hash value, a physical storage location of the host data, a counter indicating an age of the entry (e.g. a number of times the entry has been scanned during a trimming operation), duplicate data info, and a flag indicating whether the entry is a sampled data entry.

The method 1000 may include checking an interval since the last entry was marked as sampled, at 1018. The interval may be based on real time, based on a number of operations, based on an amount of processed data, or some other interval. For example, entries may be marked as sampled at an interval threshold of X times per second, or every Y Megabytes (MB) of data writes received. If the interval is not greater than the threshold, at 1020, the method 1000 may include setting a first indicator or flag identifying the hash entry as a standard entry, which may be maintained in the database for a first period of time if the data remains unique, at 1024. If the interval is greater than the threshold, at 1020, the method 1000 may include setting a second indicator or flag identifying the hash entry as a "sampled" entry that will be retained in the database for a second, longer period of time if the data remains unique, at 1022. It should be noted that additional intervals may be used to set different types of sampled data, each corresponding to a different database retention duration. An example of a database trimming operation is described in regard to FIG. 11.

Figure 11:
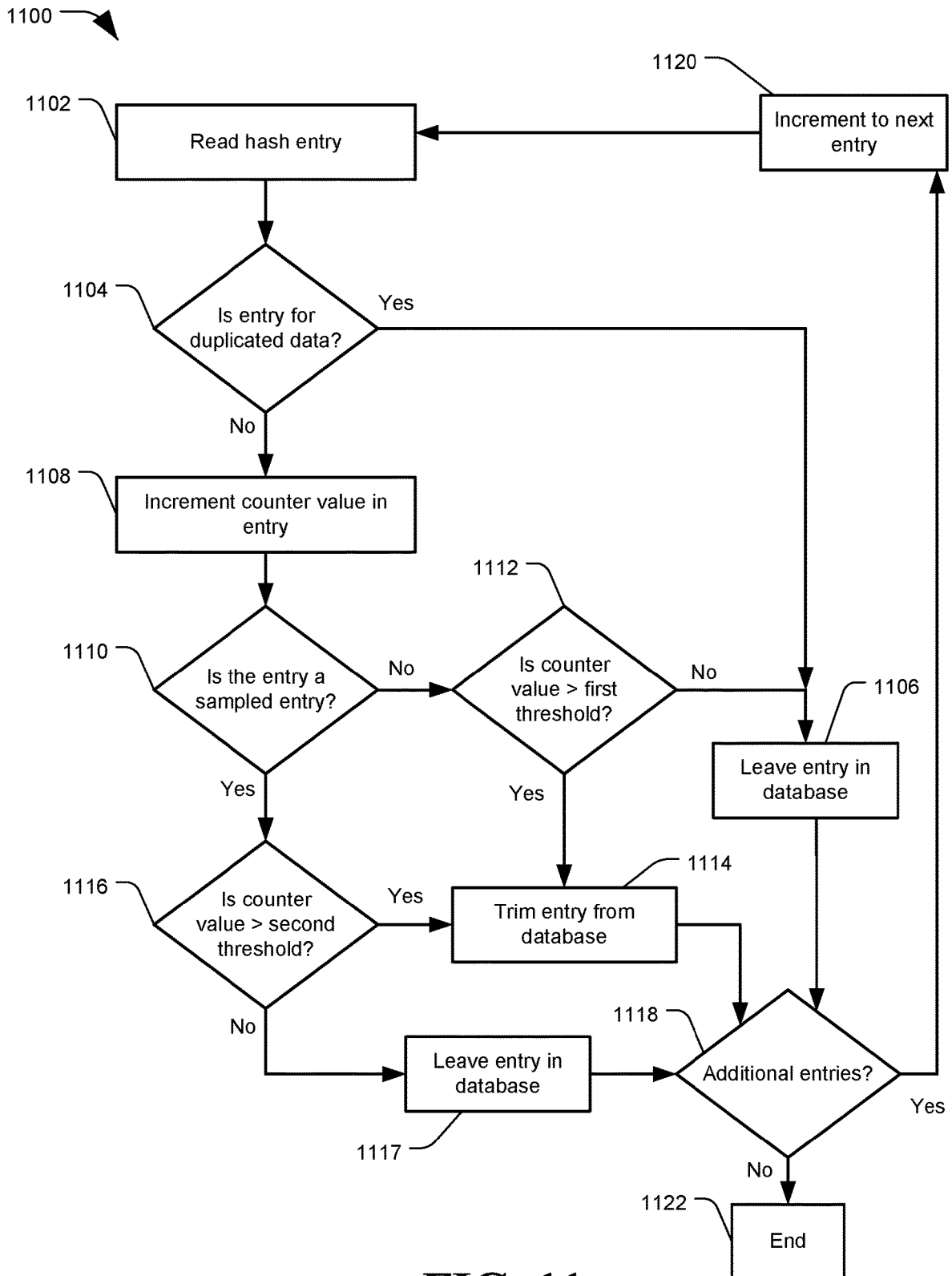
FIG. 11 is a method flow diagram of a system configured to employ multiple duration deduplication entries, in accordance with certain embodiments of the present disclosure.

FIG. 11 depicts a method 1100 flow diagram of a system configured to employ multiple duration deduplication entries, in accordance with certain embodiments of the present disclosure. The method 1100 may depict an example trimming operation, a process by which the system removes entries from the database if they remain unique for longer than designated time intervals. The trim operation may be performed at selected intervals, such as twice per day. The method 1100 may be performed by a hash trimmer module 212 of the system, or by other processors, controllers, or software or hardware components.

The method 1100 may include reading a hash entry, at 1102. A determination may be made whether the entry is for duplicated data, at 1104. For example, each hash entry may include a "counter" metadata field, with a value of 0-127 indicating unique data and a number of times it has been encountered by the trimming operation, and a value of 128-255 indicating duplicated data and an indication of the amount of times the data has been duplicated. Duplicated data may be retained in the hash database regardless of age, and therefore once the data is duplicated there may be no need to continue counting trimming operations or an age of the hash entry.

If the hash entry is for duplicated data, the method 1100 may include leaving the entry in the database, at 1106, and then checking for additional entries to scan, at 1118. Hash entries for duplicate data may be left in the database indefinitely (or until the data is no longer duplicated, if instances of the data are deleted), or they may be removed from the database only after an extended period of time without encountering additional duplicates.

If the hash entry is not for duplicated data, at 1104, the method 1100 may include incrementing the counter value in the entry, at 1108. For example, if this is the first time the trim operation has encountered the entry, the counter value may be incremented from 000 to 001.

At 1110, the method 1100 may include determining if the current entry is flagged as a sampled entry. For example, this may include checking a flag of the hash entry to determine whether a second longer time threshold has been set for the entry, or if the entry should be removed after a first, shorter time threshold. If the entry is not a sampled entry, the method 1100 may include determining whether the counter value is greater than the first threshold, at 1112. The first threshold may represent a time limit after which unique non-sampled entries are removed from the database. If the counter value is greater than the first threshold, the method 1100 may include trimming the entry from the database, at 1114. If the counter value is not greater than the first threshold, the method 1100 may include leaving the entry in the database, at 1106.

If the entry is a sampled entry, at 1110, the method 1100 may include determining whether the counter value is greater than a second threshold, at 1116. The second threshold may represent a time limit after which unique sampled entries are removed from the database. If the counter value is greater than the second threshold, the method 1100 may include trimming the entry from the database, at 1114. If the counter value is not greater than the second threshold, the method 1100 may include leaving the entry in the database, at 1117.

After trimming an entry from the database at 1114, or after determining that the counter value is not greater than the first or second threshold and should be left in the database at 1106 or 1117, respectively, the method 1100 may include determining if there are additional database entries to scan, at 1118. If not, the method may end, at 1122. If there are additional entries to scan, the method 1100 may include incrementing to the next entry, at 1120, and reading the hash entry, at 1102. The method 1100 may then proceed until all database entries have been scanned.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
a circuit configured to perform data deduplication operations, including:
store, in a computer memory, a hash database configured to prevent storage of duplicate data via database entries identifying a subset of existing stored data;
designate certain entries to be retained in the hash database for an extended duration compared to a default duration based on indicators set when the database entries are initially created, including:
set a first indicator for a first unique entry indicating that the first unique entry is to be maintained for the default duration;
set a second indicator for a second unique entry indicating that the second unique entry is to be maintained for the extended duration to detect duplicate data received at longer intervals than the default duration;
when received write data is duplicative with existing stored data associated with the second duration,
perform a read operation to retrieve other data that was stored within a selected period of the existing stored data associated with the second duration, and
generate a new hash database entry for the other data; and
perform data deduplication based on the first unique entry and the second unique entry.

2. The apparatus of claim 1 comprising the circuit configured to perform the data deduplication operations further including:
store a new database entry to the hash database when new unique data is received for storage.

3. The apparatus of claim 2 comprising the circuit further configured to:
perform a trim operation to remove database entries from the hash database when the database entries have remained unique for longer than a corresponding duration, including:
compare an age of a selected database entry to a first threshold corresponding to the default duration when the selected database entry has the first indicator set;
compare the age to a second threshold corresponding to the extended duration when the selected database entry has the second indicator set; and
remove the selected database entry from the hash database if the age exceeds the respective first threshold or second threshold.

4. The apparatus of claim 3 comprising the circuit further configured to:
perform the trim operation, further including:
measure the age of the selected database entry based on a counter representing a number of times the selected database entry has been scanned during trim operations; and
increment the counter for the selected database entry during the trim operation.

5. The apparatus of claim 3 comprising the circuit further configured to:
perform the trim operation, further including:
determine whether the selected database entry is for duplicated data; and
do not remove the selected database entry from the hash database when the selected database entry is for duplicated data.

6. The apparatus of claim 2 comprising the circuit further configured to:
set the second indicator for one new database entry per a selected amount of new data received.

7. The apparatus of claim 1 comprising the circuit further configured to:
compare a hash of the received write data to database entries in the hash database;
determine that the received write data is duplicative with existing stored data based on a stored hash database entry matching the hash of the received write data; and
when the stored hash database entry is associated with the extended duration, designate a selected number of next new hash database entries to be maintained for the extended duration.

8. The apparatus of claim 1 comprising the circuit further configured to:
compare a hash of the received write data to database entries in the hash database; and
determine that the received write data is duplicative with the existing stored data based on a stored hash database entry matching the hash of the received write data.

9. An apparatus comprising:
a circuit configured to perform data deduplication operations to prevent storage of duplicative data, including:
store, in a computer memory, a hash database including database entries having metadata identifying existing stored data;
flag certain entries to be retained in the hash database for an extended time interval compared to a default time interval based on indicators set when the database entries are initially created, including:
set a first indicator for a first database entry indicating the first database entry is to be retained for the default time interval;
set a second indicator for a second database entry indicating the second database entry is to be retained for the extended time interval to detect duplicate data received at longer intervals than the default time interval;
based on a determination that received write data is duplicative with existing stored data associated with the second duration, set a selected number of next consecutive new database entries with the second indicator; and
perform data deduplication based on the first unique entry and the second unique entry.

10. The apparatus of claim 9 comprising the circuit further configured to:
perform a trim operation to remove database entries from the hash database when the database entries have remained unique for longer than a corresponding time interval, including:
compare an age of a selected database entry to a first threshold corresponding to the default interval when the selected database entry has the first indicator set;
compare the age to a second threshold corresponding to the extended time interval when the selected database entry has the second indicator set; and
remove the selected database entry from the hash database if the age exceeds the respective first threshold or second threshold.

11. The apparatus of claim 10 comprising the circuit further configured to:

perform the trim operation, further including:
    do not remove the selected database entry from the hash database when it is for duplicated data;
    measure the age of the selected database entry based on a counter representing a number of times the selected database entry has been scanned during trim operations; and
    increment the counter for the selected database entry during the trim operation.

12. The apparatus of claim 9 comprising the circuit further configured to:
    set a third indicator for a third database entry, the third indicator identifying a third time interval to maintain the third database entry in the hash database longer than the extended time interval; and
    when no duplicative data is detected for the third database entry, remove the third database entry from the hash database after the third time interval has elapsed.

13. The apparatus of claim 9 comprising the circuit further configured to:
    set the second indicator for one new database entry per a selected time interval.

14. The apparatus of claim 9 comprising the circuit further configured to:
    compare a hash of the received write data to database entries in the hash database; and
    determine that the received write data is duplicative with the existing stored data based on a stored hash database entry matching the hash of the received write data.

15. The apparatus of claim 9 further comprising:
    perform the data deduplication based on the first unique entry and the second unique entry comprises:
        receive a write command, including write data, at an input circuit;
        generate a hash of the write data;
        compare the hash of the write data to the first unique entry and the second unique entry;
        determine that the write data is duplicative with existing stored data based on one of the first unique entry and the second unique entry matching the hash of the received write data;
        when the hash of the received data matches the second unique entry with the second indicator set,
            perform a read operation to retrieve other data that was stored within a determined period of the existing stored data corresponding to the second unique entry; and
        generate a new hash database entry for the other data.

16. A method comprising:
    performing data deduplication operations to prevent storage of duplicative data, including:
        storing, in a computer memory, a hash database including database entries identifying existing stored data, wherein the database entries and associated existing stored data have distinct retention periods;
        designating certain entries to be retained in the hash database for an extended time interval compared to a default time interval, including:
            setting a first indicator for a first database entry indicating the first database entry is to be retained for the default time interval;
            setting a second indicator for a second database entry indicating the second database entry is to be retained for the extended time interval to detect duplicate data received at longer intervals than the default time interval;
        retaining the first database entry and the second database entry in the hash database for durations designated by the first indicator and the second indicator, respectively;
        removing database entries for unique stored data from the hash database after a duration exceeding a corresponding time interval;
        performing data deduplication based on the first unique entry and the second unique entry;
        when received write data is duplicative with existing stored data corresponding to a stored hash database entry having the second indicator set:
            performing a read operation to retrieve other data that was stored within a selected temporal proximity to the existing stored data corresponding to the stored hash database entry; and
            generating a new hash database entry for the other data.

17. The method of claim 16 further comprising:
performing a trim operation to remove database entries from the hash database when the database entries have remained unique for longer than the corresponding time interval, including:
    comparing an age of a selected database entry to a first threshold corresponding to the default time interval when the selected database entry has the first indicator set;
    comparing the age to a second threshold corresponding to the extended time interval when the selected database entry has the second indicator set; and
    removing the selected database entry from the hash database if the age exceeds the respective first threshold or second threshold.

18. The method of claim 17 further comprising:
measuring the age of the selected database entry based on a counter representing a number of times the selected database entry has been scanned during trim operations.

19. The method of claim 16 further comprising:
setting a selected number of next new database entries with the second indicator after receiving data duplicative with stored data corresponding to the second database entry.

20. The method of claim 16 further comprising:
comparing a hash of the received write data to database entries in the hash database;
determining that the received write data is duplicative with the existing stored data corresponding to the stored hash database entry based on the stored hash database entry matching the hash of the received write data.

* * * * *